United States Patent [19]
Fukaya

[11] Patent Number: 5,316,396
[45] Date of Patent: May 31, 1994

[54] PRINTER CAPABLE OF PRINTING IN A DESIRED PRINT RANGE

[75] Inventor: Kousuke Fukaya, Kariya, Japan

[73] Assignee: Brother Kogyo Kabushiki Kaisha, Aichi, Japan

[21] Appl. No.: 903,481

[22] Filed: Jun. 24, 1992

[30] Foreign Application Priority Data

Jun. 24, 1991 [JP] Japan .................... 3-151846

[51] Int. Cl.$^5$ .......................... B41J 2/00
[52] U.S. Cl. ................... 400/76; 400/121; 395/102; 395/116
[58] Field of Search ........... 400/76, 121, 708; 395/102, 110, 111, 114, 115, 116, 117, 139, 151

[56] References Cited

U.S. PATENT DOCUMENTS

| | | | |
|---|---|---|---|
| 4,897,735 | 1/1990 | Oneda | 358/449 |
| 4,928,252 | 5/1990 | Gabbe | 395/102 |
| 4,996,650 | 2/1991 | Kembo | 395/116 |
| 5,100,248 | 3/1992 | Crupe | 400/76 |
| 5,121,468 | 6/1992 | Daino | 395/102 |

FOREIGN PATENT DOCUMENTS

| | | | |
|---|---|---|---|
| 184156 | 7/1989 | Japan | 400/121 |
| 2172767 | 9/1986 | United Kingdom | 358/449 |

OTHER PUBLICATIONS

Patent Abstracts of Japan, vol. 13, No. 593 (M-914)(3941) Dec. 27, 1989.
Patent Abstracts of Japan, vol. 14, No. 224 (M-972)(4167) May 11, 1990.
Patent Abstracts of Japan, vol. 15, No. 55 (P1164) (4583) Feb. 8, 1991.

Primary Examiner—David A. Wiecking
Assistant Examiner—Steven S. Kelley
Attorney, Agent, or Firm—Oliff & Berridge

[57] ABSTRACT

Print data sent from a host computer can be printed in a specified print range even if the print data received from the host computer has a fixed print range. Both the fixed print range and the specified print range are represented by coordinates on a sheet of paper, and the coordinates of an image for the fixed range are converted to another coordinates adapted to print in the specified print range while changing the size of the entire image.

18 Claims, 4 Drawing Sheets

PRINTER CAPABLE OF PRINTING IN A DESIRED PRINT RANGE

BACKGROUND OF THE INVENTION

1. Field of the Invention

The present invention relates to a printer for carrying out printing on a sheet of paper upon receiving data from a host computer.

2. Description of the Prior Art

Conventionally, print data sent from a host computer are set to be printed in a predetermined range in a sheet of paper by a preselected printer. If there is a change of print range owing to the change in size of a print paper or the change of the printer, it has been required that a host computer change print data each time such change occurs. However, the change of the print data cannot be easily done in the host computer when it is desired to carry out printing within an optional print range.

SUMMARY OF THE INVENTION

The present invention has been made to solve the above problem, and accordingly it is an object of the present invention to provide a printing device wherein even print data sent from a host computer is adapted for printing within a fixed range in a sheet of paper, letters and/or graphic images are printable to match a desired print range without need for modifying the print data at the host computer.

In order to achieve the above and other objects, the present invention provides a printer including (a) print data storage means for storing print data on page basis; (b) developing means for developing a first print range based on the print data stored in the print data storage means; (c) first print range storage means for storing the first print range developed by the developing means; (d) specifying means for specifying a second print range in which one page print data stored in the print data storage means are printed; (e) second print range storage means for storing the second print range specified by the specifying means; and (f) converting means for converting the print data stored in the print data storage means to data to be printed in the second print range.

Both the first and second print range are represented by coordinates on the sheet of print paper, and the converting means converts the coordinates of an image to be printed in the first print range to another coordinates to be printed in the second print range. Further, the converting means changes size of the image so that one page print data are printed in the second print range in its entirety.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

Figure 1:
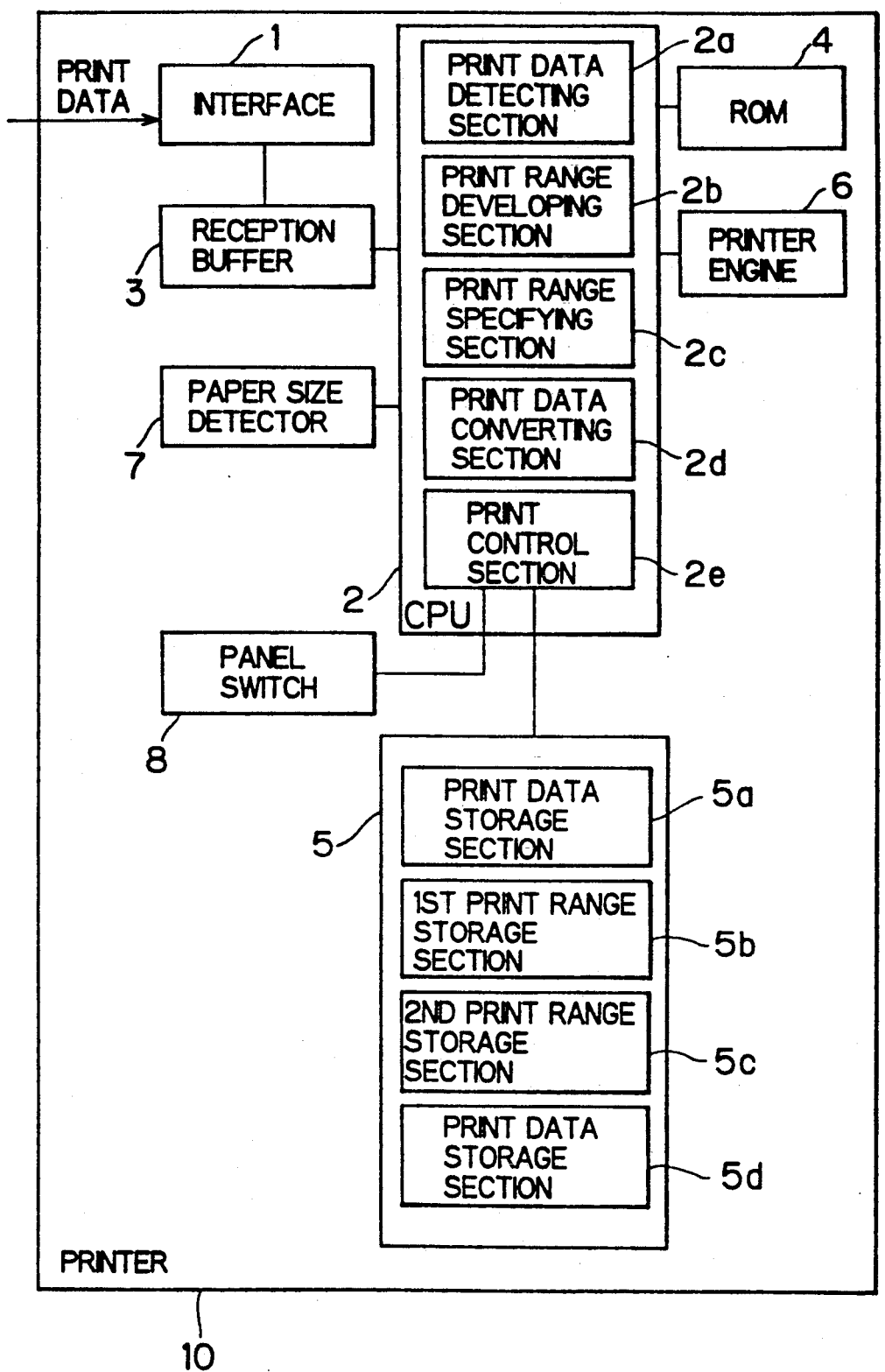
FIG. 1 is a block diagram showing an arrangement of a printer according to an embodiment of the present invention.

FIG. 1 shows in block form an electrical arrangement of a printer according to a preferred embodiment of the present invention. An interface 1 is connected via a reception buffer 3 to a central processing unit (CPU) 2. The CPU 2 carries out various kinds of jobs and it can be divided into various sections in terms of the jobs executed. The CPU 2 serves as a print data detecting section 2a, a print range developing section 2b, a print range specifying section 2c, a print data converting section 2d, and a print control section 2e. The print data detecting section 2a detects a change-of-page command contained in the print data indicating that print data for one page has been received. The print range developing section 2b develops a predefined print range or first print range in a sheet of paper based on the print data stored in a print data storage section 5a. The print range is a selected print area in the sheet of paper in which the print data are printed. The print range or print area is defined by determining upper, lower, left and right margins. The print range specifying section 2c detects a print range specifying command contained in the print data transmitted to the printer from a host computer, and specifies a second print range in which the one page print data stored in a print data storage section 5b are actually printed. The print range specifying section 2c may specify the second print range in accordance with the output from a paper size detector 7 which detects the paper size or a paper tray in which print papers of a particular size are stored. Alternatively, the print range specifying section 2c may specify the second print range in accordance with the print range inputted through a panel switch 8.

The print data converting section 2d converts the print data stored in the print data storage section 5a to data to be printed in the second print range. As will be described later, the first and second print ranges are represented by coordinates on the print paper, and the print range converting section 2d converts the coordinates of an image adapted to the first print range to another coordinates to be printed in the second print range upon effecting reduction, enlargement or movement of the image to be printed in the first print range. The print control section 2e controls printing operation of a printer engine 6 which carries out printing based on the print data processed by the CPU 2 on the sheet of paper. A reception buffer 3 is connected between the interface 1 and the CPU 2 and temporarily stores the print data received through the interface 1.

A read-only memory (ROM) 4 stores a program for running the CPU 2. A random access memory (RAM) 5 has various storage locations which are the print data storage section 5a for storing one page print data detected by the print data detecting section 2a, a first print range storage section 5b for storing the first print range developed by the print range developing section 2b, a second print range storage section 5c for storing the second print range specified by the print range specifying section 2c, and a print data storage section 5d for storing the print data converted by the print data converting section 2d.

Figure 2:
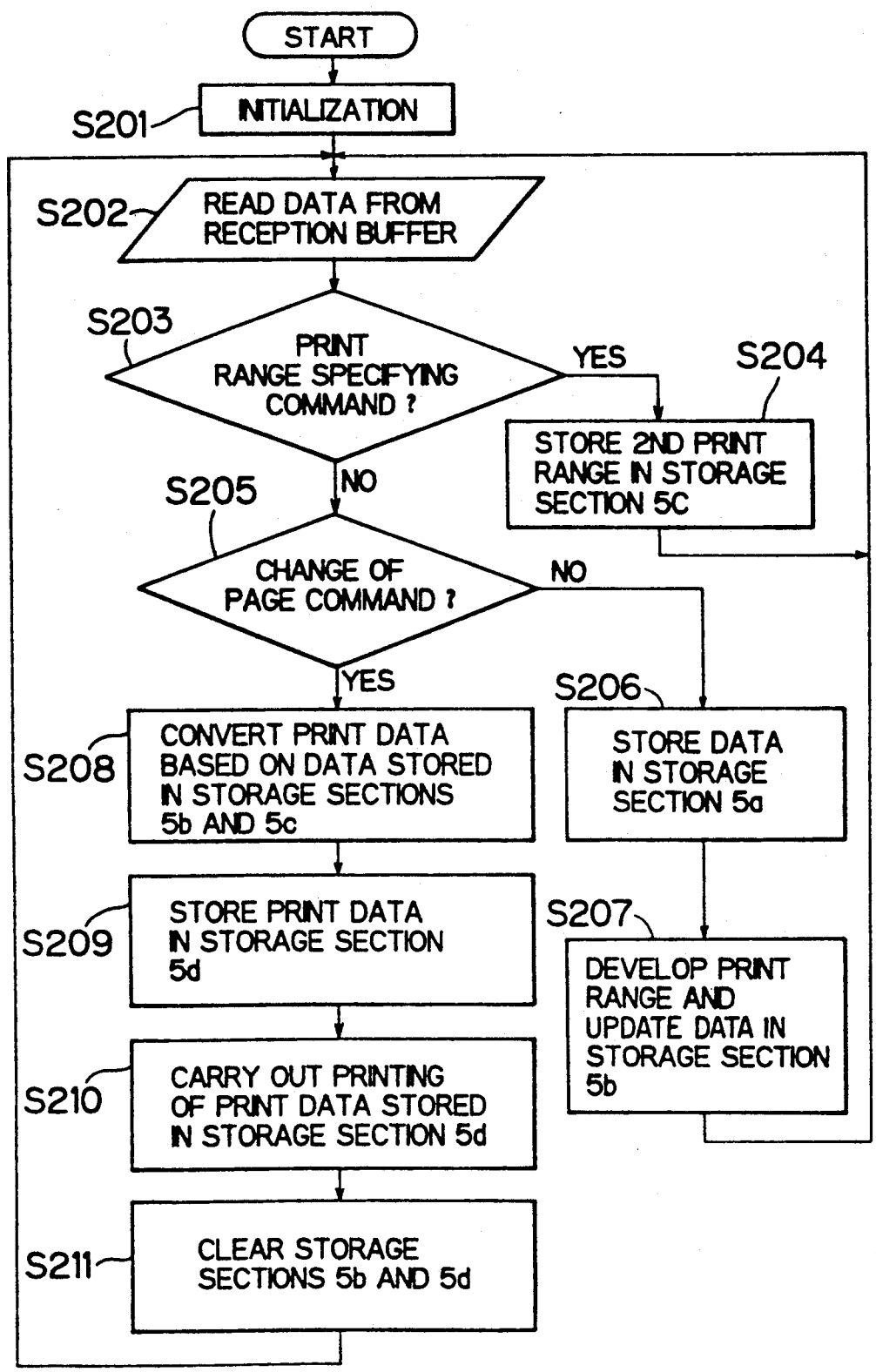
FIG. 2 is a flow chart illustrating an operational sequence executed by the printer according to the embodiment of the present invention.

Operation of the printer will be described with reference to the flow chart shown in FIG. 2.

In step S201, initialization of the RAM 5 is performed. In step S202, the data received through the interface 1 and stored in the reception buffer 3 are read. In step S203, it is checked that the data thus read are a print range specifying command. If "YES", the print range represented by the print range specifying command is stored in the second print range storage section 5c in step S204. On the other hand, if the decision made in step S203 is "NO", it is checked that the data read in step S202 are a change-of-page command in step S205. If the data read in step S205 are not the change-of-page command, the data are determined as either letter data or graphic data and are stored in the print data storage section 5a. In step S207, the size of each image (letter or graphic) is developed and the print range stored in the first print range storage section 5a is updated, whereupon the routine returns to step S202.

When the data read in step S205 are the change-of-page command, it is determined that one page print data have been received. In step S208, the print data are converted to be printable in the second print range now stored in the second print range storage section 5c. As will be described later, the first and second print ranges are represented by coordinates on the sheet of paper, and the coordinates of the image to be printed in the first print range is converted to another coordinate to be printed in the second print range. In step S209, the print data converted in step S208 is stored in the print data storage section 5d. In step S210, the print data stored in the print data storage section 5d are printed. In step S211, both the print data storage section 5d and the first print range storage section 5b are cleared for the subsequent processing, whereupon the routine returns to step S202.

In the operation described, no matter in what print range the print data have been set, this print range is developed and the print data are converted so as to meet the specified print range, whereby the printing can be carried out in the specified print range.

Figure 3A:
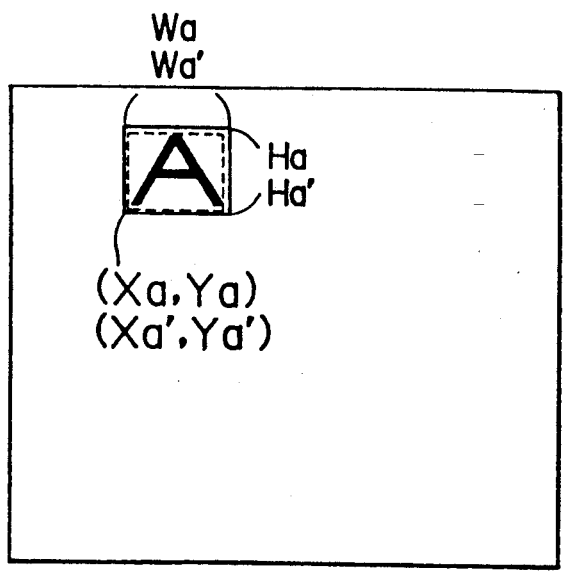
FIGS. 3(a) through 3(c) are explanatory diagrams for describing processing of one page print data to compute and update a printing range.

Next, the processing in step S207 will be further described in detail with reference to FIGS. 3(a) through 3(c). In the following description, an origin of the coordinate on the sheet of paper is set to lower left corner thereof. The print zone of each letter or each graphic image is set to be a minimum rectangular shape in which the letter or graphic image can be included. The position of the rectangular print zone is defined by the lower left coordinates, and the size of the print zone is defined by the width and height of the rectangular zone.

It is assumed that print data representative of letter "A", print data representative of letter "B" and graphic image data representative of a circle are sequentially transmitted from the hose computer in the stated order. FIG. 3 (a) shows a processing of the print data regarding the letter "A". The print data regarding the letter "A" is composed of letter print position data (Xa, Ya), letter width data Wa, letter height data Ha, and a letter code which may be an ASCII code representing the letter "A". Thus the print zone of the letter "A" is defined by a dotted line. The print range define by a solid line is stored in the first print range storage section 5b to store the lower left coordinates (Xa, Ya), the width Wa, and the height Ha.

Figure 3B:
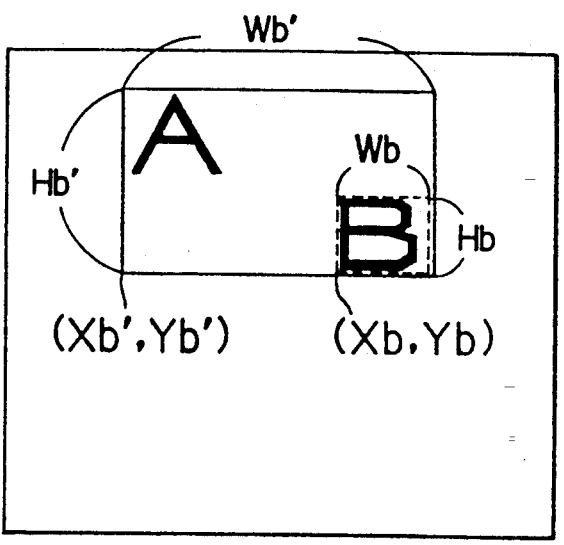

FIG. 3 (b) shows a processing of the letter "B" print data received following the letter "A" print data. Like the letter "A" print data, the letter "B" print data are composed of letter print position data (Xb, Yb), letter width data Wb, letter height data Hb, and a letter code representing the letter "B". The print zone of both the letters "A" and "B" is indicated by a dotted line in FIG. 3(b) and the data stored in the first print range storage section 5b are updated to data representing the print zone define by the solid line in FIG. 3(b). That is, the data now stored in the first print range storage section 5b are the lower left coordinates (Xb', Yb'), the width Wb', and the height Hb'.

Xb' is set to the smaller value of Xa and Xb. Yb' is set to be the smaller value of Ya and Yb. Wb, is set to be the larger value of (Xa+Wa−Xb') and (Xb+Wb−Xb'). Hb' is set to be the larger value of (Ya+Ha−Yb') and (Yb+Hb−Yb'). In the rectangular zone drawn by the solid line in FIG. 3(b), Xb'=Xa, Yb'=Yb, Wb'=Xb+Wb−Xa, Hb'=Ya+Ha−Yb.

Figure 3C:
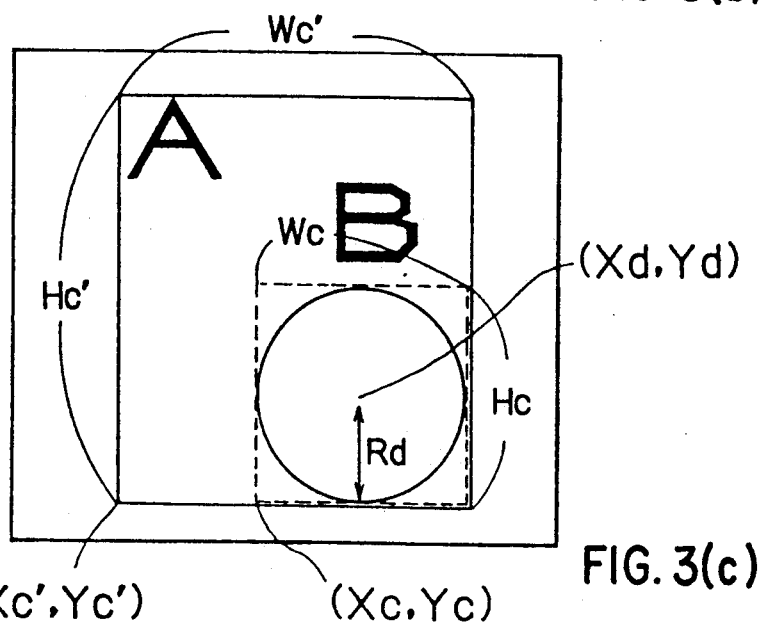

FIG. 3 (c) shows a processing executed when graphic data are received. The graphic data represent a circle and are composed of circular center coordinate data (Xd, Yd) and circular radial data Rd. The print zone of the circle as indicated by a dotted line in FIG. 3(c) is defined by the lower left coordinate (Xc, Yc), width Wc and height Hc. Therefore, the following relations exist: Xc=Xd−Rd, Yc=Yd−Rd, Wc=2Rd, and Hc=2Rd. The data in the first print range storage section 5b is updated to indicate the rectangular zone indicated by a solid line in FIG. 3(c) which is defined by the lower left coordinates (Xc', Yc'), width Wc' and height Hc'. Xc' is set to be the smaller value of Xb' and Xc. Yc' is set to be the smaller value of Yb' and Yc. Wc' is set to be the larger value of (Xb'+Wb'−Xc') and (Xc+Wc−Xc'). Hc' is set to be the larger value of (Yb'+Hb'−Yc') and (Yc+Hc−Yc'). In the example shown in FIG. 3(c), Xc'=Xb', Yc'=Yc, Wc'=(Xc+Wc−Xc'), and Hc'=(Yb'+Hb'−Yc). In this manner, the print zone is updated each time the letter or graphic data are received from the host computer until a change-of-page command is detected.

Next, the processing in steps S208, S209 and S210 will be further described in detail with reference to FIGS. 4(a) through 4(c).

Figure 4A:
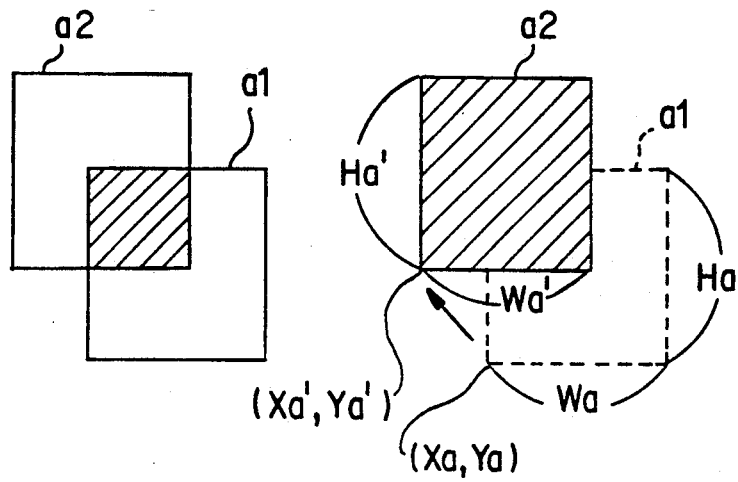
FIGS. 4(a) through 4(c) are explanatory diagrams for describing computation of print data to print in a desired print range.

In FIG. 4 (a), the blackened portions indicate the printed portions. The print range a1 is developed based on one page print data transmitted from the host computer and the print range a2 is specified to carry out printing in this range. The print range a1 is represented by the lower left coordinates (Xa, Ya), width Wa, and height Ha as computed in step S207. The print range a2 is specified in step S204, which is represented by the lower left coordinates (Xa', Ya'), the width Wa' and the height Ha'. FIG. 4(a) shows a relationship of Xa>Xa', Ya<Ya', Wa=Wa' and Ha=Ha'.

The leftside of FIG. 4(a) indicates printing carried out by the conventional printer, wherein only an overlapped portion of the print ranges a1 and a2 is printed and the rest of the print range a2 is not printed. With the printer of the present invention, as shown in the rightside of FIG. 4(a), by adding coordinates (X'a−Xa, Y'a−Ya) to the coordinates of the print data, the print position is shifted so that printing is carried out within the print range a2.

Figure 4B:
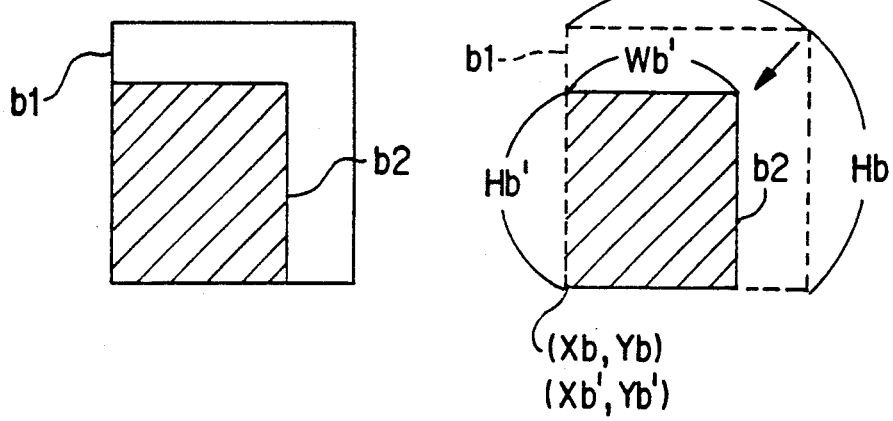

Referring next to FIG. 4(b), the print range b1 is determined by one page print data transmitted from the host computer and the print range b2 is specified to carry out printing in this range. The print range b1 is represented by the lower left coordinates (Xb, Yb), width Wb, and height Hb as computed in step S207. The print range b2 is specified in step S204, which is represented by the lower left coordinates (Xb', Yb'), the width Wb' and the height Hb'. FIG. 4(b) shows a relationship of Xb=Xb', Yb<Yb', Wb>Wb' and Hb>Hb'.

The leftside of FIG. 4(b) indicates printing carried out by the conventional printer, wherein only an overlapped portion of the print ranges b1 and b2 is printed and the rest of the print range b2 is not printed. With the printer of the present invention, as shown in the rightside of FIG. 4(b), by setting Wb'/Wb or Hb'/Hb whichever is smaller as a reduction ratio Eb and then multiplying the reduction ratio Eb to the coordinates of the printing letter or the print letter size, printing can be carried out within a reduced print area and the letters and the graphics to be printed in the print range b1 can be printed in the specified print range b2.

Figure 4C:
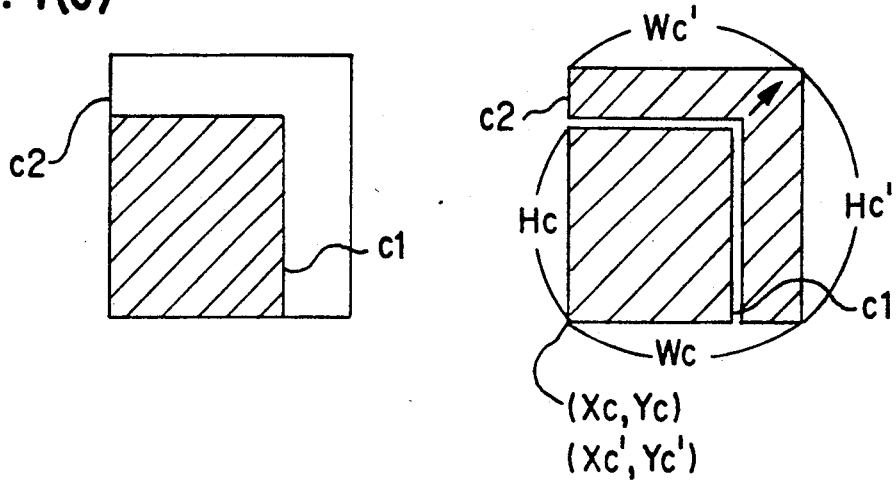

Referring to FIG. 4(c), the print range c1 is determined by one page print data transmitted from the host computer and the print range c2 is specified to carry out printing in this range. The print range c1 is represented by the lower left coordinates (Xc, Yc), width Wc, and height Hc as computed in step S207. The print range c2 is specified in step S204, which is represented by the lower left coordinates (Xc', Yc'), the width Wc' and the height Hc'. FIG. 4(c) shows the relationship of Xc=Xc', Yc=Yc', Wc<Wc' and Hc<Hc'.

The leftside of FIG. 4(c) indicates printing carried out by the conventional printer, wherein the entire print range c1 is printed but not the entire print range c2. With the printer of the present invention, on the other hand, as shown in the rightside of FIG. 4(c), by setting Wc'/Wc or Hc'/Hc whichever is smaller as an enlargement ratio Ec and then multiplying the enlargement ratio Ec to the coordinates of the printing letter or the print letter size, printing can be carried out within an enlarged print area and the letters and the graphics to be printed in the print range c1 can be printed in the specified print range c2.

As described, the print data are converted based on both a first print range obtained from the print data and a second print range as specified, whereby the print data can be printed within the specified print range in its entirety. Even if the data sent from a host computer are of a fixed print range, the data can be printed in a specified print range without altering the print data each time the print range is changed.

While the present invention has been described with reference to a specific embodiment, it can be understood for a person skilled in the art that a variety of changes and modifications may be made without departing from the scope of the present invention. For example, the print range can be specified through detection of a paper size or a paper tray in which print papers of a particular size are stored, or by inputting a desired print range through a panel switch provided in the printer.

What is claimed is:

1. A printer comprising:
   print data storage means for storing print data on page basis;
   developing means for developing a first print range based on the print data stored in said print data storage means;
   first print range storage means for storing coordinates representing the first print range developed by said developing means;
   specifying means for specifying a second print range in which one page print data stored in said print data storage means are printed;
   second print range storage means for storing coordinates representing the second print range specified by said specifying means; and
   converting means for converting a size of an image to be printed in the first print range to another size so that one page print data are printed in the second print range in its entirety.

2. The printer according to claim 1, wherein both the first and second print ranges are rectangles, each rectangle having a corner, a width and a height.

3. The printer according to claim 2, wherein a rate of change in the image size is determined based on a ratio of the width of the rectangle of the second print range to the width of the rectangle of the first print range.

4. The printer according to claim 3, wherein the first and second print ranges are defined by coordinate values representing the corner, the width and the height of the respective rectangles.

5. The printer according to claim 2, wherein a rate of change in the image size is determined based on a ratio of the height of the rectangle of the second print range to the height of the rectangle of the first print range.

6. The printer according to claim 5, wherein the first and second print ranges are defined by coordinate values representing the corner, the width and the height of the respective rectangles.

7. The printer according to claim 1, further comprising paper size detecting means for detecting a size of a print paper in which printing is carried out, wherein said specifying means specifies the second print range depending on the size of the print paper detected by said paper size detecting means.

8. A printer comprising:
   print data storage means for storing print data on a page basis;
   developing means for developing a first print range based on the print data stored in said print data storage means;
   first print range storage means for storing coordinates representing the first print range developed by said developing means;
   specifying means for specifying a second print range in which one page print data stored in said print data storage means are printed;
   second print range storage means for storing coordinates representing the second print range specified by said specifying means; and
   converting means for converting the print data stored in said print data storage means to data to be printed in the second print range,
   a sheet wherein said converting means converts the coordinates of an image to be printed in the first print range to another coordinates to be printed in the second print range, and wherein the print data include letter data representing a letter to be printed, the letter being identified by a letter code, a print position of the letter being defined by print position data represented by coordinates on the sheet of print paper, and a size of the letter being defined by width data representative of a width of the letter and height data representative of a height of the letter.

9. The printer according to claim 8, wherein the print data further includes graphic data representing a graphic image to be printed, a print position of the graphic image being defined by print position data represented by the coordinates on the sheet of print paper, and a configuration of the graphic image being defined by configuration data.

10. The printer according to claim 9, wherein the graphic data representing a circle is defined by coordinates of a center of the circle and a radius of the circle.

11. The printer according to claim 10, wherein the print data further include a print range specifying command, and a change-of-page command, and wherein said specifying means specifies the second print range in accordance with the print range specifying command.

12. The printer according to claim 11, wherein both the first and second print ranges are rectangles, each rectangle having a corner, a width and a height.

13. The printer according to claim 8, further comprising paper size detecting means for detecting a size of a print paper in which printing is carried out, wherein said specifying means specifies the second print range depending on the size of the print paper detected by said paper size detecting means.

14. A printer comprising:
  print data storage means for storing print data on a page basis;
  developing means for developing a first print range based on the print data stored in said print data storage means;
  first print range storage means for storing coordinates representing the first print range developed by said developing means;
  specifying means for specifying a second print range in which one page print data stored in said print data storage means are printed;
  second print range storage means for storing coordinates representing the second print range specified by said specifying means; and
  converting means for converting the print data stored in said print data storage means to data to be printed in the second print range; and
  input means for inputting a desired print range, wherein said specifying means specifies the second print range in accordance with the print range inputted by said input means.

15. The printer according to claim 14, wherein both the first and second print ranges are rectangles, each rectangle having a corner, a width and a height and being defined by a coordinate of the corner, the width and the height, and wherein said converting means converts the coordinates of an image to be printer in the first print range to another coordinates to be printed in the second print range.

16. The printer according to claim 15, wherein said converting means changes size of the image so that one page print data are printed in the second print range in its entirety.

17. The printer according to claim 16, wherein a rate of change in the image size is determined based on a ratio of the width of the rectangle of the second print range to the width of the rectangle of the first print range.

18. The printer according to claim 16, wherein a rate of change in the image size is determined based on a ratio of the height of the rectangle of the second print range to the height of the rectangle of the first print range.

* * * * *